Aug. 20, 1963

C. A. GODCHARLES ETAL 3,100,942

TEACHING MACHINE

Filed June 27, 1960

INVENTORS
GEORGE H. GABRIELSON
JOHN H. JACOBSON, JR.
JOHN W. BLYTH
CHARLES A. GODCHARLES

BY Davis, Hoxie, Faithfull + Hapgood
ATTORNEYS

Aug. 20, 1963

C. A. GODCHARLES ETAL 3,100,942

TEACHING MACHINE

Filed June 27, 1960

INVENTORS
GEORGE H. GABRIELSON
JOHN H. JACOBSON, JR.
JOHN W. BLYTH
CHARLES A. GODCHARLES

BY Davis, Hoxie, Faithfull + Hapgood
ATTORNEYS

Aug. 20, 1963  C. A. GODCHARLES ETAL  3,100,942
TEACHING MACHINE
Filed June 27, 1960  10 Sheets-Sheet 8

INVENTORS
GEORGE H. GABRIELSON
JOHN H. JACOBSON, JR.
JOHN W. BLYTH
CHARLES A. GODCHARLES
BY Davis, Hoxie, Faithfull + Hapgood
ATTORNEYS 3,100,942
TEACHING MACHINE
Charles A. Godcharles, John W. Blyth, and John H. Jacobson, Jr., Clinton, and George H. Gabrielson, New Hartford, N.Y., assignors to Hamilton Research Associates, Inc., a corporation of New York
Filed June 27, 1960, Ser. No. 38,872
5 Claims. (Cl. 35—8)

This invention relates to educational training devices for human beings and more particularly relates to a class of such devices known as "teaching machines."

It has been understood for some time by professional educators and psychologists that the student's ability to learn any given subject matter depends not only on his individual intelligence quotient, but also to a large extent on the logic of the order of presentation of the material. We are all familiar with the basic method by which children are taught to read and write by subjecting them first to simple words and illustrations of common objects as for example "cat," "dog," "chair," etc. Later, the children are subjected to simple sentences illustrated by action drawings, such as, "The dog chased the cat." The logic of teaching, as developed over the centuries, may be applied to all kinds of subject matter to decrease the time required for a person to learn the subject.

Our invention makes use of the basic teaching method of presenting data of an interrogative nature to the student, provides means to receive his written response thereto, presents the correct response thereto and finally receives a written amended response from the student where his first response was incorrect. Our machine will visually present all types of pictorial data as, for example, charts, diagrams, maps, people, buildings, paintings, specimens, equations, printed matter, etc. It is a valuable teaching aid in almost any subject, such as, logic, mathematics, grammar, science, foreign language, art, etc.

Prior art teaching machines have two basic limitations which our machine overcomes. One of these limitations has been that generally a special machine was required for a specific subject matter, such as mathematics. Machines not so limited to a specific field have the limitation of having inefficient data input systems, such as printed perforated cards or printed paper tape inputs. These systems subject the input media to wear and tear and the input media is bulky for storage purposes and expensive to duplicate.

Our teaching machine makes use of microfilm techniques wherein filmed subject matter is laminated into durable plastic or paper strips. The film technique reduces the input data system to minimum size and is extremely convenient for storage and duplication. In use, the film never comes in contact with moving parts and is thus subject to a minimum of wear and tear. An additional advantage of microfilm is that the material is less susceptible to unauthorized viewing by the student prior to its use in the machine, as would be the case with printed rolls or printed cards.

In our arrangement a card containing a series of microfilmed interrogations and the correct responses thereto is inserted in the machine by the student. The card in turn is scanned in the optical path of a film projection system, to visually present the interrogations in the prescribed order. An interrogation is presented to the student and he writes his response on a paper tape. He then depresses an "Answer" button. Thereupon, the pre-recorded correct response is simultaneously made visible with the original interrogation as the tape, bearing the written response, is moved under a window through which the student may view his answer and compare it with the correct answer. The student next depresses a "Right" or "Wrong" button which internally tabulates his score on a mechanical counter. If the student makes an error he amends his answer on the newly exposed tape. On depressing a "Question" button, the film strip is indexed to the succeeding interrogation and the tape is advanced to a fresh portion. The process is then repeated until the last question has been answered. In this process the display of interrogations cannot be altered by the student, i.e., the logical sequence of presentation cannot be lost.

Thus having described the overall operation of our teaching machine we hereinafter will describe the mechanical details of the machine which are best understood by reference to the drawings of which:

FIG. 17 is a schematic diagram of the electrical system of the machine;
and
FIG. 18 is a perspective view of the mounted film strip.

Figure 1:
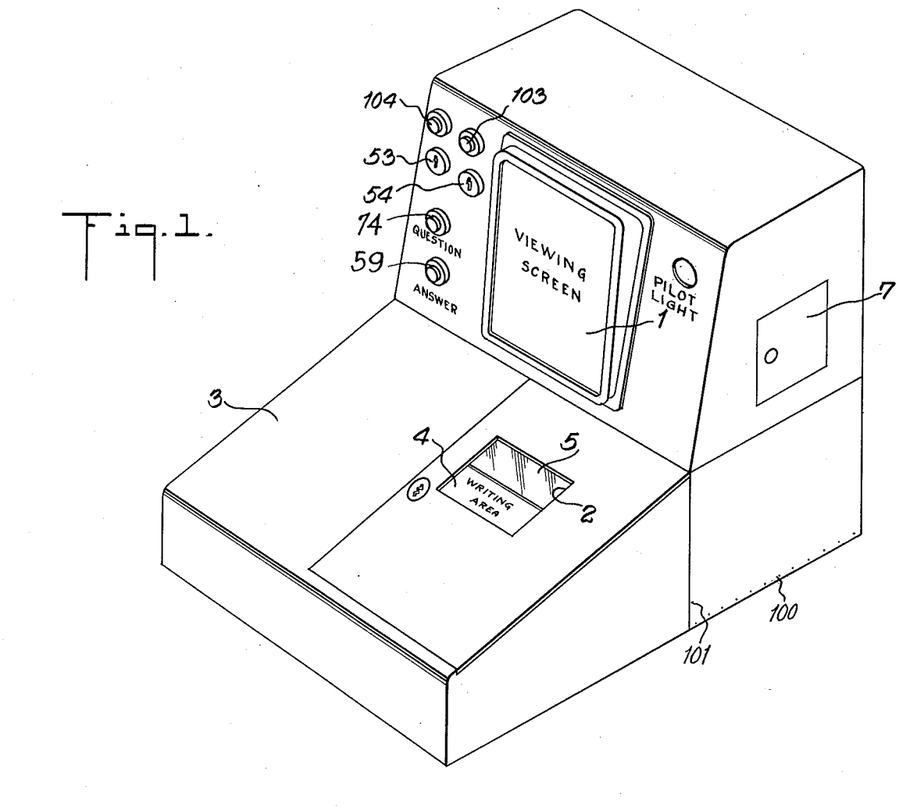
FIG. 1 is a perspective overall view of the teaching machine showing its case and external controls.

FIG. 1 shows the overall external appearance of our teaching machine. The viewing screen 1 at the center of the raised back panel portion presents the programmed set of interrogations and answers to the student. Within the opening 2 on the front panel 3 is a moving paper tape 4 on which the student writes his answer in response to the interrogation. The tape, containing the student's answer, is advanced before the correct answer is disclosed at the bottom of the viewing screen 1. The student's answer is moved beneath the transparent window 5 prior to the correct answer appearing on the viewing screen so the student may not correct his original answer. The other devices on the panels are electrical pushbuttons whose action will be described in detail later in this specification.

The input data is arranged in a transparent plastic strip 6 as shown in FIG. 18. The strip shown has two rows of 16 mm. movie film each having 20 frames per row and providing a total of 40 questions. The strip could be modified to have more rows and more frames per row, but we have found by experimentation that 40 frames are usually sufficient for a stated problem both when considering the subject matter and the problem of student fatigue. Side door 7 is opened to permit insertion of the film strip onto film subcarriage 25. Thereafter the strip is moved about as to be described below, without manual positioning by the student.

The essential internal components of the machine are the motor drive system, the optical system, the film strip transport system and the tape propulsion system. The drive system is required to activate the film strip transport mechanism and the tape propulsion system.

Figures 1B, 2:
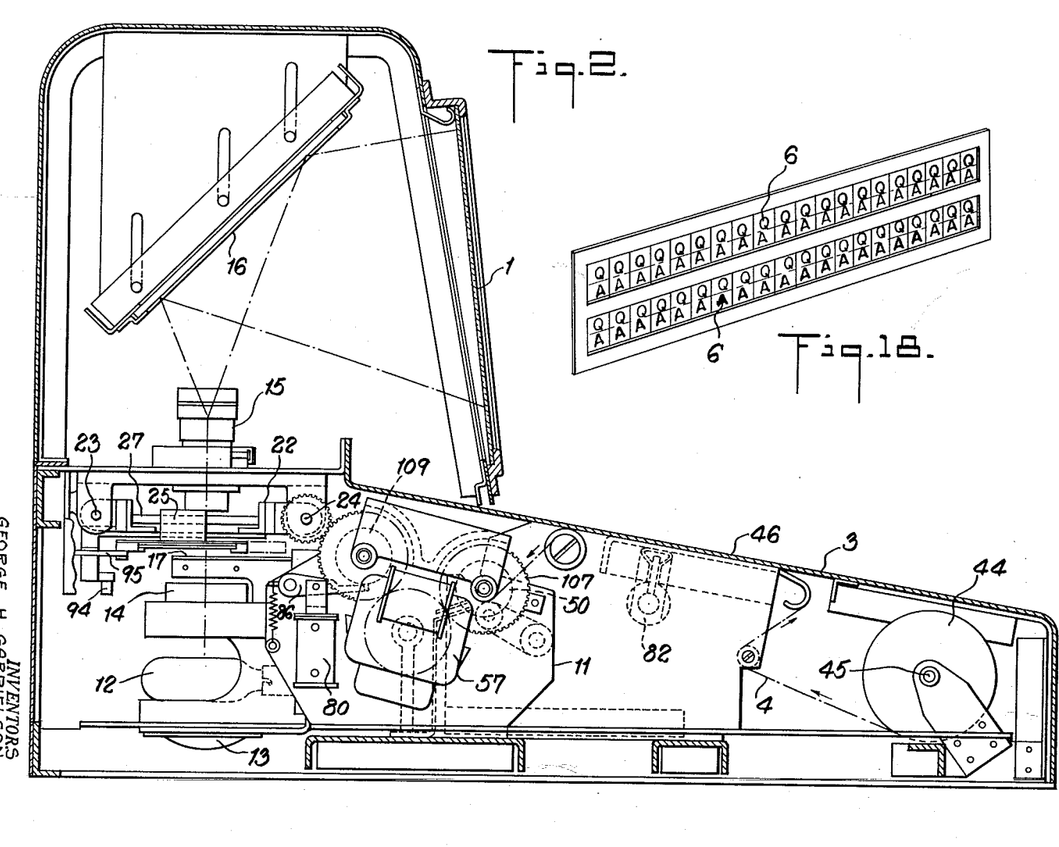
FIG. 2 is a cut-away side view of the machine.
Figure 3:
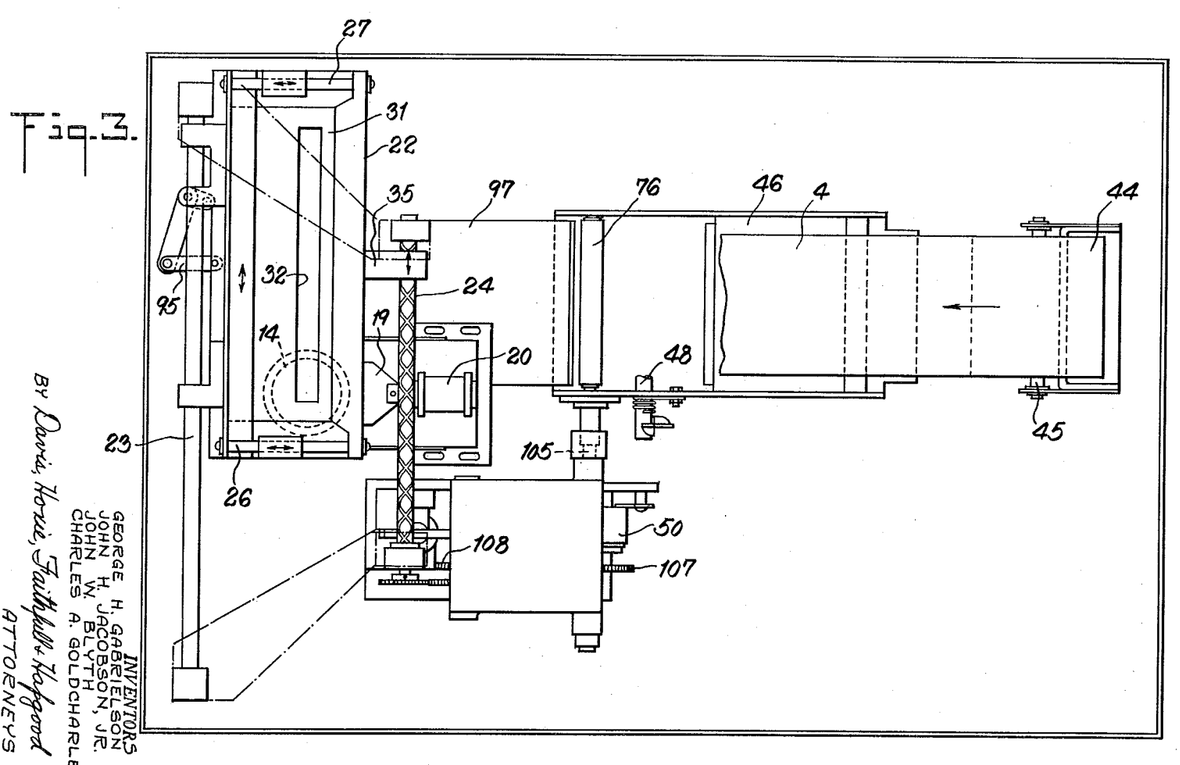
FIG. 3 is a top plan view illustrating the paper tape propulsion system and the film strip transport system.
Figure 4:
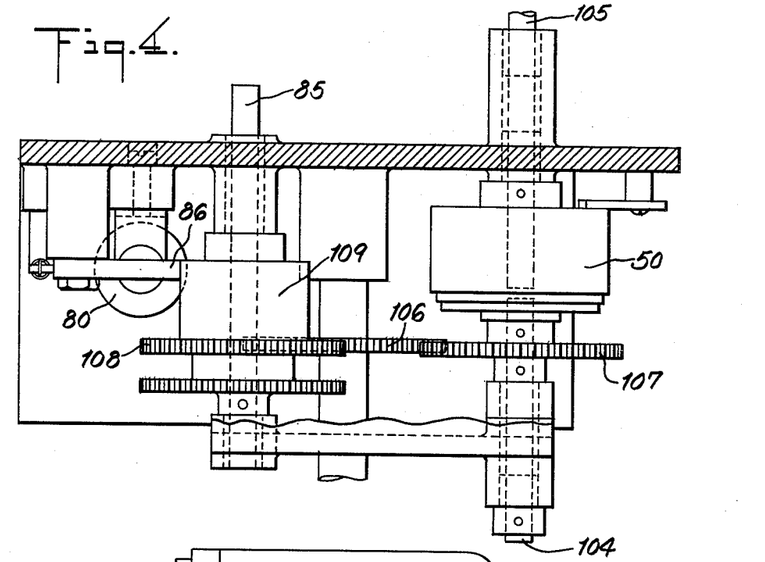
FIG. 4 is a top cut-away view of the drive mechanism of the machine.
Figure 5:
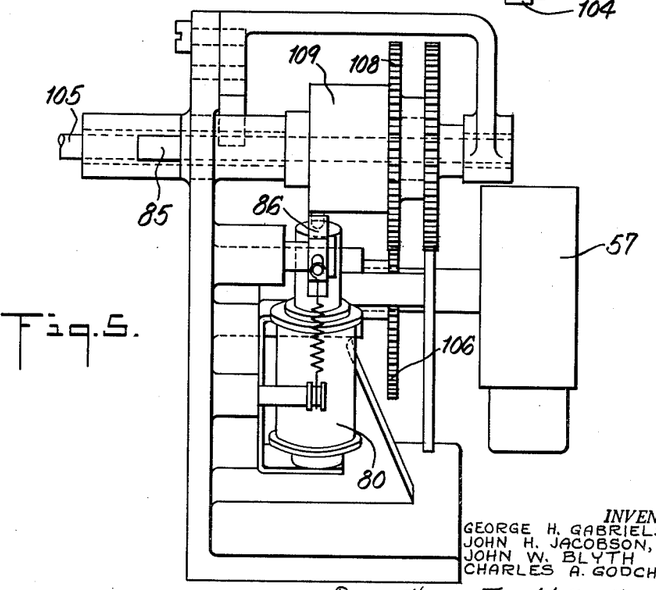
FIG. 5 is a side view of the drive mechanism of FIG. 4.
Figure 10:
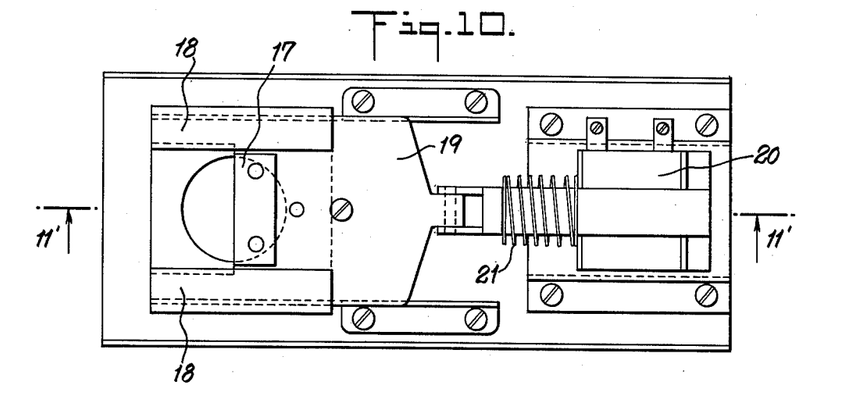
FIG. 10 is a top plan view of the optical system of the machine including the lamp, condenser lens assembly and shutter.
Figure 11:
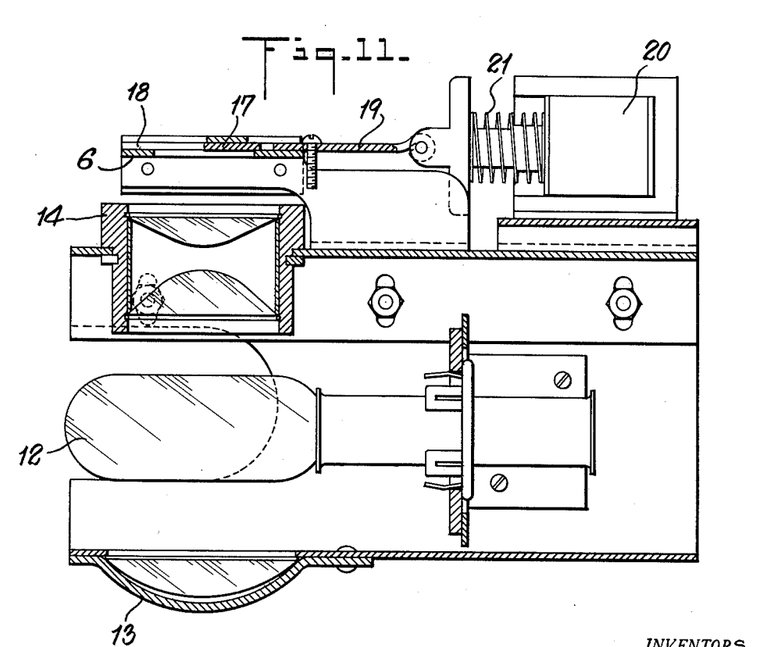
FIG. 11 is a side view, along line 11'—11' of FIG. 10, of the optical system.
Figure 12:
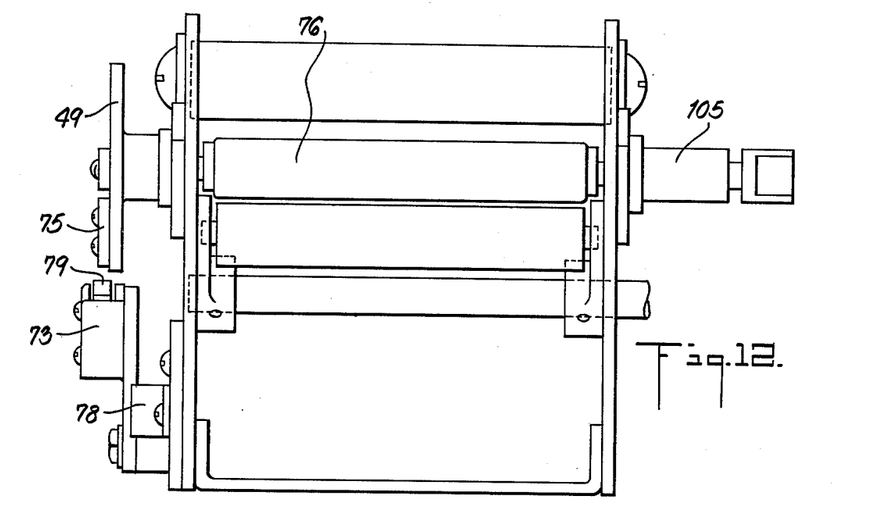
FIG. 12 is an end elevation view of the paper tape feed mechanism, including the paper driving roller.
Figures 13, 14:
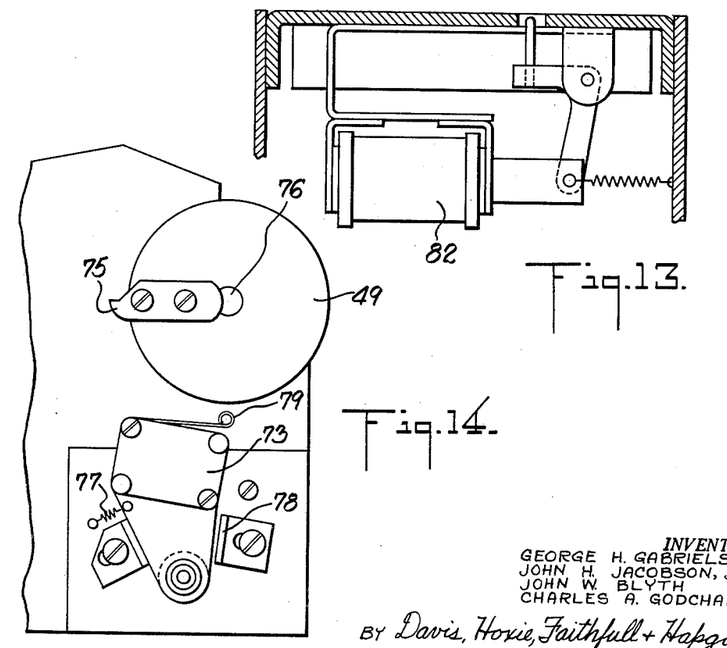
FIG. 13 is a side cut-away view illustrating the paper punching device.
FIG. 14 is a partial side view of the paper tape metering roller and its associated switch.

The optical film projection system will be described in reference to FIGS. 2, 10 and 11. The projection lamp 12 furnishes the necessary illumination in conjunction with the reflector 13, condensing lens system 14, projection lense 15 and reflective mirror 16 in the usual order of arrangement. In conjunction with the optical system it is to be noted that while the film frames are of standard 16 mm. dimensions the information is arranged at right angles to the normal moving picture technique. Thus, the information appears to move from side to side as viewed, rather from top to bottom.

A shutter blade 17 travels in tracks 18. A film strip 6, as shown in FIGURE 11, is positioned between the condensing lens 14 and the shutter blade 17. The shutter is connected by a link 19 to a solenoid 20. The shutter is biased by a spring 21 in a normally closed position so that the solenoid, when energized, pulls the shutter out of the optical path to expose the correct response to the interrogation. As shown in FIG. 10 the interrogation occupies not more than about the top 75 percent of the frame and the response is in the lower 25 percent. In the normal position, i.e., shutter closed, none of the answers on the film strip can be viewed, since they move laterally beneath the shutter.

The film strip transport mechanism is described in conjunction with FIGS. 3, 6, 8 and 9. The main carriage 22 is adapted to move laterally on guide rails 23 and 24. A subcarriage 25 within the main carriage is adapted for movement at right angles thereto on guide rails 26 and 27. The subcarriage carries the film strip 6 in the guides 28 and 29. A sheet of heat reflective glass 30 protects the film from the intense heat of the projection beam. The main carriage bottom plate 31 has a slot 32 which serves as an optical mask for the film strip. The subcarriage 25 carries a lever 95 pivoted at 96 and at the other end to the arm 93 of bell crank 92 carried by the main carriage. After the 20 frames of the first row are scanned, further movement of the main carriage causes the lever 94 of the bell crank 92 to contact the stop 91 thus shifting the subcarriage laterally to bring the second row of film into optical alignment with the slot.

Figures 6, 7:
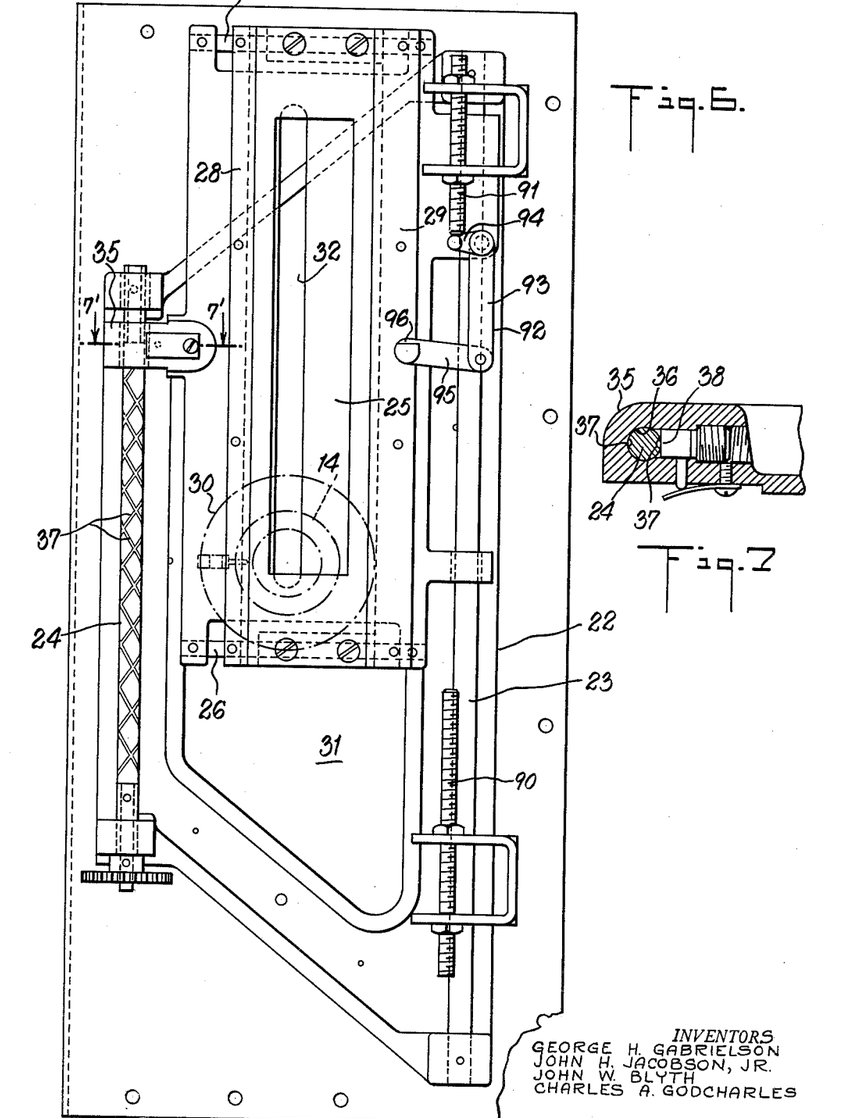
FIG. 6 is a top plan view of the film strip transport system.
FIG. 7 is a partial cut-away view of the carriage block taken along lines 7'—7' of FIG. 6.
Figures 8, 9:
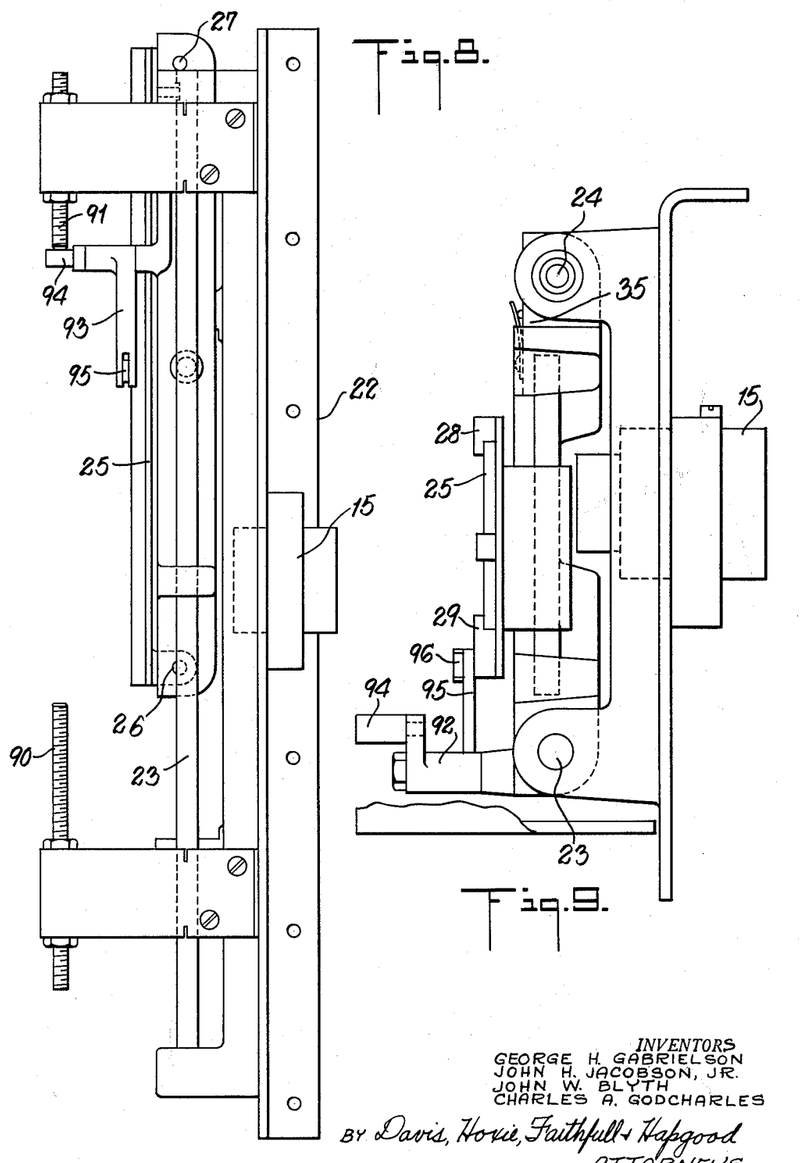
FIG. 8 is a back view of the film strip transport system of FIG. 6.
FIG. 9 is a side view of the film strip transport system of FIG. 6.

To provide the lateral motion to the main carriage 22 a block 35 is secured to the carriage and is provided with an opening 36 for the drive shaft 24. The drive shaft carries an endless helical thread 37 having a pitch of 30%. Within the block 35 is a stylus 38 biased into the groove of the helical thread. The gearing is so arranged that when the driveshaft 24 rotates one full revolution block 35 moves the carriage a distance equal to one frame of the 16 mm. film. When the block 35 reaches one end of the drive shaft, the direction automatically reverses as the film strip is shifted to the next row. Thus for one complete cycle of movement of the main carriage a total of 40 frames will have been presented. As the main carriage returns to its original position the bell crank lever 94 engages stop 91 moving the subcarriage back to its original position, and the system is then ready for removal of the first film strip and insertion of a subsequent film strip.

The tape transfer mechanism is shown in FIGS. 3, 4, 5, 12 and 14. A spool of paper tape 44 is mounted as shown on the take-off shaft 45. The tape is threaded over writing surface 46, driving roller 76, tension roller 48 and into tape box 97. Power is supplied to the driving roller 76 from the tape drive shaft 105 through magnetic clutch 50 which is coupled to the driving unit. Clutch 50 is powered by a coil 70 (see FIGURE 17). When the magnetic clutch 50 is energized driving roller 76 pulls tape until cam 75 on hub 49 mounted on the end of roller 76 operates switch 73 to de-energize the magnetic clutch 50, upon one full revolution of the driving roller 76.

The amount of tape advanced at each command is determined by the circumferential dimension of the driving roller. It may now be seen that on command the tape advances a given distance and then stops automatically.

The construction of cam 75 on on roller 76 together with spring loaded switch 73, with its spring 77 and stop member 78, avoids the possibility of the cam 75 being held by switch knob 79.

Figure 15:
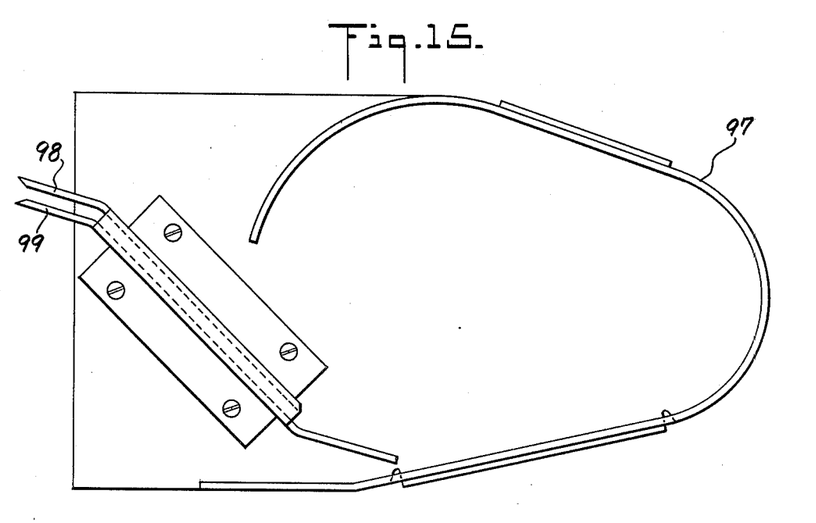
FIG. 15 is a side view of the paper tape receiving box.
Figure 16:
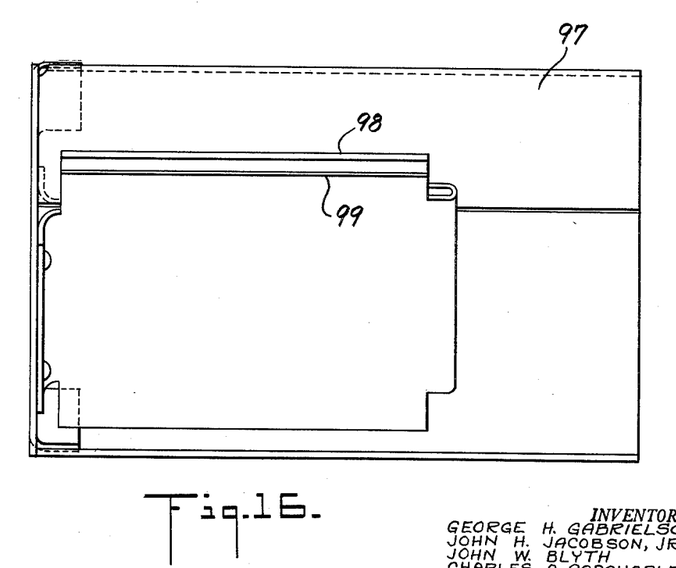
FIG. 16 is a top view of the box illustrated in FIG. 15.

The tape enters box 97 (see FIGS. 15 and 16) through guides 98 and 99. After completion of the tape box 97 may be opened on hinge 100 and may be removed from the panel through opening 101.

The electrical circuit will be described in reference to FIG. 17, the schematic diagram of our machine.

In operation, 115 volts A.C. are applied to terminals 51 and 52. Switch 53 is the front panel line key switch. Fuse 55 is in series with the power line to protect the machine from line voltage surges or internal short circuits. When the switches 53 and 54 are closed, the projection lamp 12, the drive motor 57, and the pilot lamp 58 are turned on, and the first question is projected onto the viewing screen.

Assuming the student has written his response on the exposed tape, his next action is to depress the "Answer" switch 59. Line voltage is present at contacts A and C of switch 59 by way of relay contact 60. As switch 59 is closed, power is applied to the coil of relay $K_2$, which applies power to relay contact 63, thereby applying power to shutter solenoid 20. As shutter solenoid 20 operates, the shutter is withdrawn and the answer is exposed to the student. The closing of relay contact 61 applies power momentarily to relay coil $K_1$ closing relay contact 72 and thereby connecting the paper tape drive clutch coil 70 of clutch 50 to its source of D.C. current bridge rectifier 71. Energizing clutch 50 causes the paper tape to advance mechanically.

When the paper tape has moved a sufficient amount to rotate the metering cam one full revolution, switch 73 closes mechanically causing relay coil $K_1$ to become de-energized, thus opening relay contact 72 causing the coil 70 of clutch 50 to be de-energized. At this point, the written answer has moved under the window, and fresh tape is now available for the amended answer, if necessary.

If the answer was correct, the student may depress a "Rights" button 103 to register his correct answer on mechanical counter (not shown).

Assuming he was incorrect, the student writes in his amended answer on the fresh tape, and then may depress a "Wrongs" button 104 to register this on another counter (not shown).

The student, now ready for the second question, releases the answer switch 59. This opens the circuit to the shutter solenoid 20, releasing it to mask the next answer. He then depresses the question switch 74. Power is applied through contact B of switch 74 and contact 84 of relay $K_4$ to relay contact 83, normally open microswitch 81, and to the film drive solenoid 80. When the solenoid coil 80 is energized it releases the mechanical latch 86 (see FIG. 5) allowing the film scan drive shaft 85 to start rotating. As the shaft and its cam 86 start rotating, switch 81 opens disconnecting solenoid coil 80 thus releasing the latch 86. When the shaft 85 rotates one full turn, the spring biased latch drops into the low portion of the cam halting the rotation. One revolution of the shaft 85 causes the film transport drive shaft 24 to rotate 1.6 revolutions shifting the film carriage a distance equal to one frame. Power is also obtained through contact 84 of relay $K_4$ to the paper piercing solenoid 82, punching the tape to mark the end of the first question. As contacts 60 of relay $K_5$ close, power is again applied to relay $K_1$ to advance the tape to move the amended response beneath the window and again present fresh tape for the response to the second question. As the paper advances the meter roller cam again opens switch 73. At this point the second question is being projected on the screen awaiting further action by the student. The action is then repeated question by question until all questions have been presented and answered.

The instructor, by closing key switch 54 may continuously run drive motor 57 (without pushing any buttons) to clear the machine when the student has stopped before reaching the last frame on the card.

The motor drive system 8 (see FIGS. 4 and 5) is powered by drive motor 57. Motor 57 rotates intermediate gear 106. Gear 106 continuously rotates gear 107 on shaft 104 on magnetic clutch 50. When power is applied to clutch 50 it rotates its shaft 105. Intermediate gear 106 also rotates gear 108 of one-turn clutch 109. Although gear 108 rotates continuously it will only turn its output shaft 85 when latch 86 is released.

Modifications may be made within the scope of the invention and the subjoined claims.

We claim:

1. A training device, comprising, a projection system and viewing screen, a bidirectional film screening system for scanning a slide having a plurality of rows of a series of frames to be viewed into the optical path of a film projecting system, first and second slide carriages, said first carriage confined to movement in a longitudinal path, said second carriage being disposed within said first carriage and adapted for movement in a transverse path, said first carriage having a stylus riding in an endless helical groove in a rotating drive shaft, the pitch of said groove so arranged that a predetermined annular displacement of the said drive shaft moves said first carriage a distance equal to one frame, said helical groove being folded back on itself to provide movement in the reverse direction at the ends of the longitudinal path, said second carriage having an actuating mechanism adapted to engage stops at the ends of the longitudinal path to provide transverse movement thereto for shifting a subsequent row of frames into alignment with said optical path, said slide frames each having one portion with interrogation and another portion with correct response, a projection lens, a movable masking shutter to obscure the response portion of the frame when projected, a viewing screen, a paper transport mechanism, means to drive the transport mechanism, a transparent window over part of the paper path, and means coordinating the projection of the frame, the masking and full exposure of the frame, and the advancement of the transport mechanism to produce the following sequence: (1) Exposure of a frame with the mask in a first position blanking the response portion and advancing said transport to position a first portion of a paper held therein to a position adjacent the transparent window; (2) Thereafter, simultaneously moving said mask to a second position allowing full exposure of the frame and actuating the paper transport to move said portion of paper under the transparent window; and (3) Finally, moving the next frame for projection and simultaneously returning said mask to the first masking position.

2. In a teaching machine of the type described which is designed to sequentially display a series of frames of a film strip wherein the frames are arranged in parallel rows, said machine comprising in combination:
   (a) an optical system disposed in said machine;
   (b) a film strip transport mechanism arranged to move the film strip so that the rows of frames are sequentially scanned in the path of said optical system;
   (c) said film strip transport mechanism including a main carriage movable along a longitudinal path;
   (d) drive means for moving said main carriage in step-wise fashion along said longitudinal path so that the frames in one row are sequentially scanned by said optical system;
   (e) said drive means including means for reversing movement of said main carriage at the ends of said longitudinal path;
   (f) a sub-carriage mounted on said main carriage for movement transverse to said longitudinal path;
   (g) said sub-carriage including means for holding a film strip so that the rows of frames extend in the direction of movement of said main carriage;
   (h) means connected to said main carriage and to said sub-carriage for moving it at the end of said longitudinal path to position a succeeding row of frames for scanning;
   (i) a mask mounted in the path of said optical system for partially masking the sequentially exposed frames; and,
   (j) means for moving said mask into and out of masking position during exposure of each frame.

3. The machine as claimed in claim 2 including a tape propulsion system for moving a strip of paper, said drive means including means for actuating said tape propulsion system in conjunction with movement of said main carriage.

4. The machine as claimed in claim 3 wherein said drive means comprises a rotatable shaft having a helical groove, the pitch of said groove being such that predetermined rotation of said shaft will move said main carriage a distance equal to one frame, a stylus carried by said main carriage and engaged in said groove, and means for rotating said shaft.

5. In a visual teaching system designed to present data of an interrogative nature so that a response can be made thereto, and to then present a correct response to said data, the structure comprising a transparent, laminated card including a microfilm strip, said microfilm strip having a series of frames arranged in a plurality of rows, each of said frames having a portion containing interrogative data and another portion containing a correct response thereto, an optical system for projecting said frames of said microfilm strip, means for moving said card so that the frames in one row are sequentially scanned in the path of said optical system and then shifting said card so that the frames in an adjacent row can be scanned in the same manner, a shutter for obscuring from view the response on the exposed frame, and means for retracting said shutter to bring the response into view before said moving means is actuated to expose another frame.

References Cited in the file of this patent

UNITED STATES PATENTS

| Re. 23,030 | Holt | Aug. 24, 1948 |
| 2,169,266 | Matter | Aug. 15, 1939 |
| 2,401,434 | Mills | June 4, 1946 |
| 2,835,052 | Raich | May 20, 1958 |
| 2,915,833 | Genest | Dec. 8, 1959 |
| 2,953,859 | Fink | Sept. 27, 1960 |
| 2,987,828 | Skinner | June 13, 1961 |

OTHER REFERENCES

"Machine is Teacher," Washington Post and Times Herald (newspaper), Friday, March 6, 1959, page B2.